Sept. 9, 1952 M. DEN HERTOG ET AL 2,610,255

ELECTRICAL SIGNALING SYSTEM

Filed Feb. 26, 1947 5 Sheets-Sheet 1

INVENTORS
MARTINUS DEN HERTOG
JAKOB KRUITHOF

BY Robert Harding Jr.

ATTORNEY

ELECTRICAL SIGNALING SYSTEM

Filed Feb. 26, 1947 5 Sheets-Sheet 2

| LOCAL TRAFFIC DIGIT | RELAY ENERGIZED (+) $K_{1r}$ | $K_{2r}$ | $K_{3r}$ | $K_{4r}$ |
|---|---|---|---|---|
| 1 | + | + | | |
| 2 | | + | + | |
| 3 | + | | + | |
| 4 | | | + | + |
| 5 | | + | | + |
| 6 | + | | | + |
| 7 | | | | + |
| 8 | | | + | |
| 9 | | + | | |
| 10 | + | | | |
| DIGIT | 1 | 2 | 3 | 4 |
| TRUNK TRAFFIC CODE — IMPULSE PER TIME ELEMENT | + | | + | |
| 1500~ IMPULSES | | | | |

INVENTORS
MARTINUS DEN HERTOG
JAKOB KRUITHOF
BY Robert Harding Jr
ATTORNEY

ELECTRICAL SIGNALING SYSTEM

Filed Feb. 26, 1947 5 Sheets-Sheet 3

INVENTOR.
MARTINUS DEN HERTOG
JAKOB KRUITHOF
BY
ATTORNEY

ELECTRICAL SIGNALING SYSTEM

INVENTOR.
MARTINUS DEN HERTOG
JAKOB KRUITHOF
BY
Robert Harding Jr.
ATTORNEY

Sept. 9, 1952 M. DEN HERTOG ET AL 2,610,255

ELECTRICAL SIGNALING SYSTEM

Filed Feb. 26, 1947 5 Sheets-Sheet 5

INVENTORS
MARTINUS DEN HERTOG
JAKOB KRUITHOF
BY
Robert Harding Jr.
ATTORNEY

Patented Sept. 9, 1952 2,610,255

UNITED STATES PATENT OFFICE 2,610,255

ELECTRICAL SIGNALING SYSTEM

Martinus den Hertog and Jakob Kruithof, Antwerp, Belgium, assignors to International Standard Electric Corporation, New York, N. Y., a corporation of Delaware Application February 26, 1947, Serial No. 731,136
In the Netherlands November 3, 1941

Section 1, Public Law 690, August 8, 1946
Patent expires November 3, 1961

1 Claim. (Cl. 179—18)

The invention relates to electrical signalling systems for the transmission of code signals by means of alternating currents. More in particular this invention is applicable to the quick transmission of code signals in so-called telecommunication systems by means of two or more voice frequency alternating currents.

The signals to be transmitted between the transmitting and receiving devices consist of a number of signalling elements, comprising closures or openings of an alternating current; the number of these elements is the same for each signal, as is also the case in different known code systems.

According to the invention alternating currents of different frequencies are used, a first frequency for indicating the constant number of singalling elements and the duration thereof, and the other frequencies for indicating the signal elements, e. g. the circuit closures or openings. The number of these frequencies depends on the number of different signals which must be transmitted, on the speed with which this has to take place, and on the constant number of signalling elements. If the system is not used for the transmission of signals representing characters or code-combinations, but exclusively for the transmission of numbers then, according to another characteristic of the invention, four elements will be sufficient for each signal, not more than two being indicated by alternating current impulses of a certain frequency. The changes in the sequence of one or two of these signalling elements, of which ten combinations can exist, is used to indicate the ten numbers 0–9. The four signalling elements constituting each number are indicated by an alternating current of another frequency e. g. by two consecutive closures and openings. The use of two or more frequencies for the transmission of signals is known, but one frequency is used to transmit the character of each signalling element and the other frequency controls the synchronization of the transmitting and receiving devices. In the well known start-stop system, for instance, synchronization takes place at each signal. In the system according to the invention synchronization does not take place for each signal, but for each transmitted signalling element.

Further details of the invention will be explained in their application to telecommunication systems, and particularly for the transmission of numerical digits in automatic telephone and/or telegraph systems in which the invention offers great advantages whose nature will now be discussed.

In telephone or like switching systems the junction traffic between different exchanges of an area is so arranged that register controllers or the like provided at each exchange control the building up of a local connection and also the completion of connections incoming from distant exchanges. The digits of the called number are received in a register controller which is taken in use in the calling exchange. When a connection to another exchange is desired, then all or part of the called digits are transferred to a register controller at the called exchange. The last-mentioned register controller will then in turn control the building up of the connection at the called exchange.

Direct current impulses are used in such system for the transfer of the digits from the register controller at the calling exchange to the register controller at the called exchange, entailing a certain loss of time.

It has been suggested to transfer digits from one register to the other in a code and thus effect a saving of time. However, direct current codes require at least two separate circuits and more than two wires between the two register controllers. Two wires are used exclusively for the transmission of the signals and a separate wire for holding the connection. The scheme cannot be applied to inter-office junction lines which have only two wires and would, therefore, necessitate the use of a ground return path, destroying the symmetry of the system.

The object of the invention is to make possible the symmetrical transmission of code signals between apparatus in two different exchanges via two-wire junction lines.

With this object in view, according to one embodiment, direct current signals are used for holding the connections and for other incidental purposes, e. g. to indicate the start or end of the transmission, and voice frequency signals of two different frequencies are used for transmitting the signals proper, i. e. the digits.

According to a characteristic feature of the invention digit signals are transmitted from a sending controlling device, e. g. a register controller of the calling exchange to a receiving control device in another exchange by means of two tone frequency alternating currents. These tone frequency signals flow through junction lines which, during the building up of the desired connection, are used for the direct current signals which may be needed. The same line serves for the traffic, e. g. for the talking currents in a telephone system.

According to the invention different digits may follow one after another with or without any interval.

Automatic toll telephone systems are known which employ voice frequency signals consisting partly of impulses for the transmission of the numerical digits of the called subscriber, and partly of other distinct signals, such as ringing signals, answering signals, etc. Numerical digits were sometimes in the form of trains of impulses of one or more frequencies, the number of impulses being equal and similar for all frequencies and determined by the digit to be transmitted (e. g. the number of these impulses could be equal to the digit. In other systems each digit is transmitted by means of a code in which one impulse of one or more frequencies is sent out simultaneously for each digit, the frequency or frequencies being chosen depending on the digit to be transmitted. Such system requires at least four different frequencies to form a code of ten different digits.

In the system according to the present invention, numerical digits are transmitted by means of not more than two frequencies in such a way that the impulses of one of the two frequencies used are sent out according to a predetermined time cycle, while the impulses of the second frequency are sent in a different time cycle. For each transmitted digit a maximum of two impulses are required for each of the two frequencies.

In the system in which direct current pulses are applied to the junction line for holding the connection and for sending various signals, the transmitting and receiving devices for the voice frequency currents are placed in signalling circuits which are connected only temporarily, i. e. during the building-up of the connection to the talking circuits. The signals are sent via the talking circuits. Since during voice frequency signalling the talking circuits are cut off, very simple voice frequency receiving devices may be used which respond to talking currents.

When the system according to the invention is used on toll lines, voice frequency receivers for two frequencies may remain connected during the conversation for receiving certain signals, e. g. ringing, and which are then non-responsive to talking currents, but which during the building-up of the connection are so arranged that a receiving relay is provided for each of the two frequencies used, responding to the signals required for the transmission of the digits. These frequencies may correspond to the two frequencies which must be sent for signals in the talking condition of the receiver, or a frequency may be used to which the so-called guard relay of the receiver responds. When the receiver is adapted for the receipt of the digit codes, the receiving relays for the two frequencies must respond to short impulses. The system must be so arranged that a long impulse of one of the frequencies de-energizes a slow relay to indicate that the connection may be broken. The impulses representing the digit codes must be of such a short duration as not to de-energize this slow relay.

According to another feature of the invention, the signal-receiving devices for toll lines receive during the building up of a toll connection digits according to the signalling system of the invention, means quickly responding to two alternating currents, such as receiving relays, being used. These means respond also to other signals during the talking condition of a connection, such as ringing and clearing signals, permitting the employment of means responding to two alternating currents of the same frequency as the above-mentioned alternating currents, or a corresponding frequency.

When register controllers are used for building up a connection in each of a plurality of exchanges, two methods may be followed for the transmission of the numerical impulses to the register controllers at the different exchanges. According to the first method the different digits are, without distinction, all sent to the register controller in the called exchange and then, if necessary, retransmitted to another register controller in the next exchange. The transmission time increases, therefore, with the number of junction lines employed.

According to the second method only that portion of the numerical digits is sent by the register controller in the calling exchange to the register controller in the subsequent exchange which is necessary to seize a junction line to a third exchange. After this, the register controller in the calling exchange will send further digits to the register controller in the third exchange. In order to be able to send these numerical digits through a tandem exchange, it is necessary to provide impulse repeaters in the equipment of the tandem exchange which receive the impulses of the calling exchange and pass them on to a following exchange with or without impulse correction.

According to the present invention, in tandem connections, only that part of the numerical digits is transmitted to the register controller in the tandem exchange which is necessary for the extension through this tandem exchange of a connection to a following exchange. Since voice frequency code signals are used for the transmission of the numerical digits, the subsequent signals need not be repeated by impulse repeaters in the tandem exchange when they are sent to the third exchange by the register controller in the calling exchange. When a free trunk to a subsequent exchange is connected, the apparatus in the tandem exchange is immediately brought into the talking position, so that the transmission of the digits can take place over the normal talking paths. Microphone-feeding bridges or other bridges for signalling purposes may be inserted into these talking paths. The omission of the impulse repeaters in the tandem exchange considerably simplifies the circuits and insures undistorted transmission.

According to another feature of the invention voice frequency signals of two different frequencies are used for the transmission of numerical digits via junction lines in the talking condition and carrying direct current signals without impulse repeaters or bridge circuits.

The last-mentioned feature may be used in tandem connections as follows:

In connections over the toll equipment it may be necessary to disconnect the feeding bridge which, for normal connections, is in the local circuit, and to replace it by a galvanic through connection, over which the subscriber's line can be connected to a specially arranged feeding bridge forming part of the toll equipment. The battery feed for toll connections may thus be over a low resistance bridge, or through an automatic resistance compensator or a bridge having a transformer to prevent unbalancing of the toll connection by the subscriber's line. Such special feeding bridge must be in the calling exchange.

In switching systems comprising registers different selector settings may have to be through the circuit which comprises said feeding bridge.

Voice frequency signals need not be transmitted over the circuit containing said feeding bridge which may, therefore, be designed for best possible speech transmission. It is not necessary that the feeding bridge be connected only after the completion of the selector settings. No direct current impulses are transmitted over the circuits which comprise the feeding bridges.

The invention will now be described with the aid of the drawings, in which.

Figure 4:
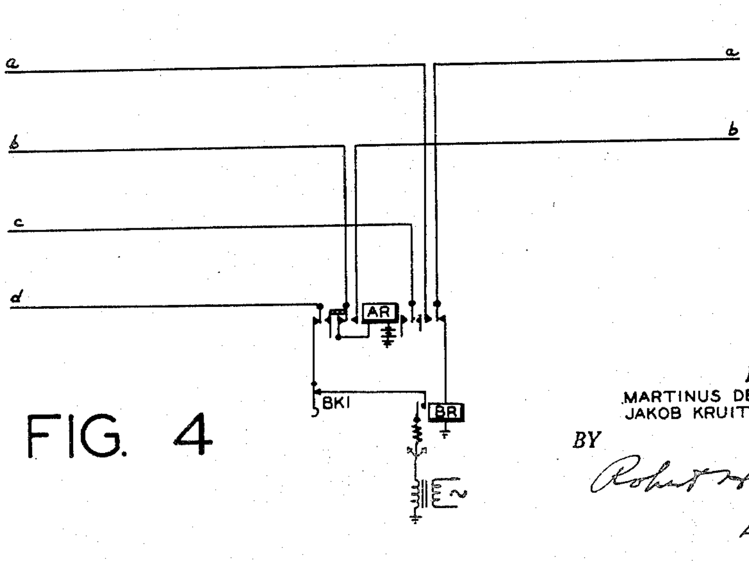
Figure 5:
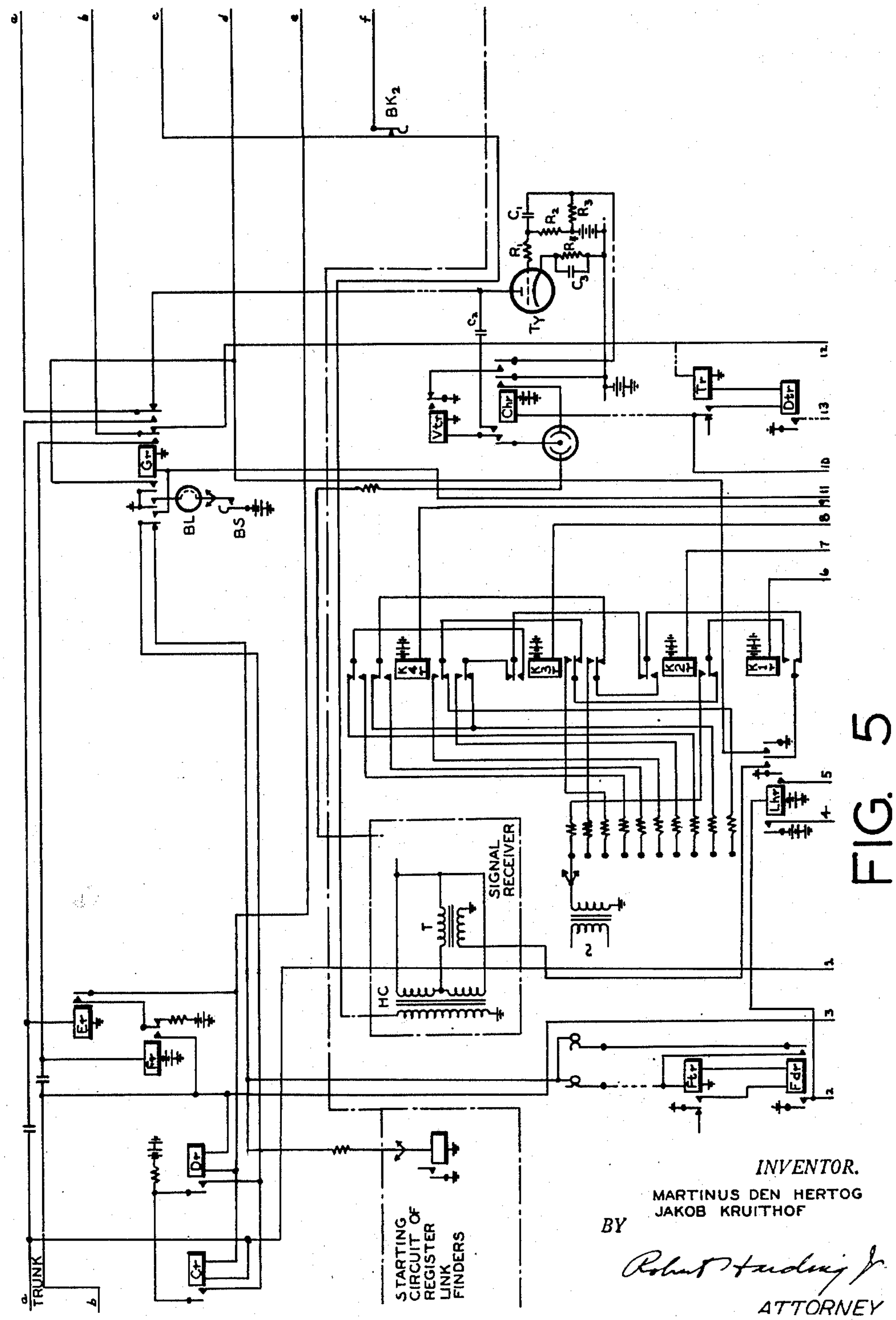
Figure 6:
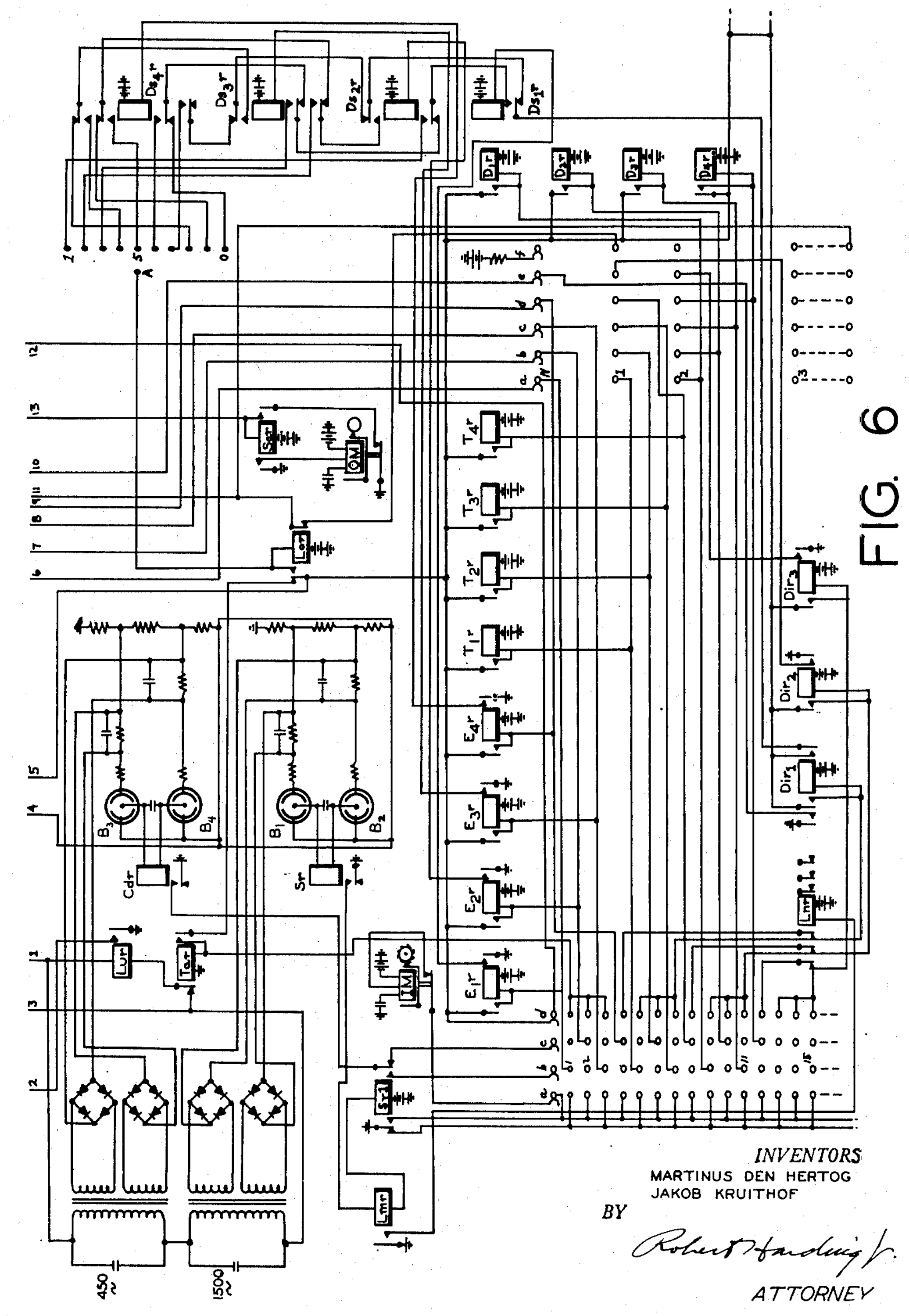

Fig. 4 a sending device;

The upper part of Fig. 5 shows a receiving device for a two-wire junction line to a distant exchange, and the lower part of Fig. 5 together with Fig. 6 a register controller handling incoming connections in a distant exchange.

Figure 7:
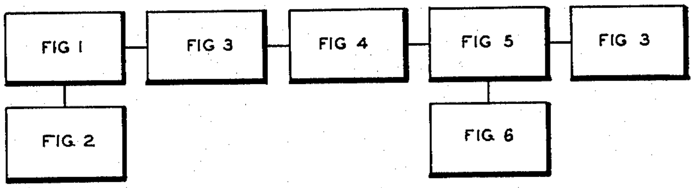

The way in which the different figures must be linked together, is shown in Fig. 7.

Figure 1:
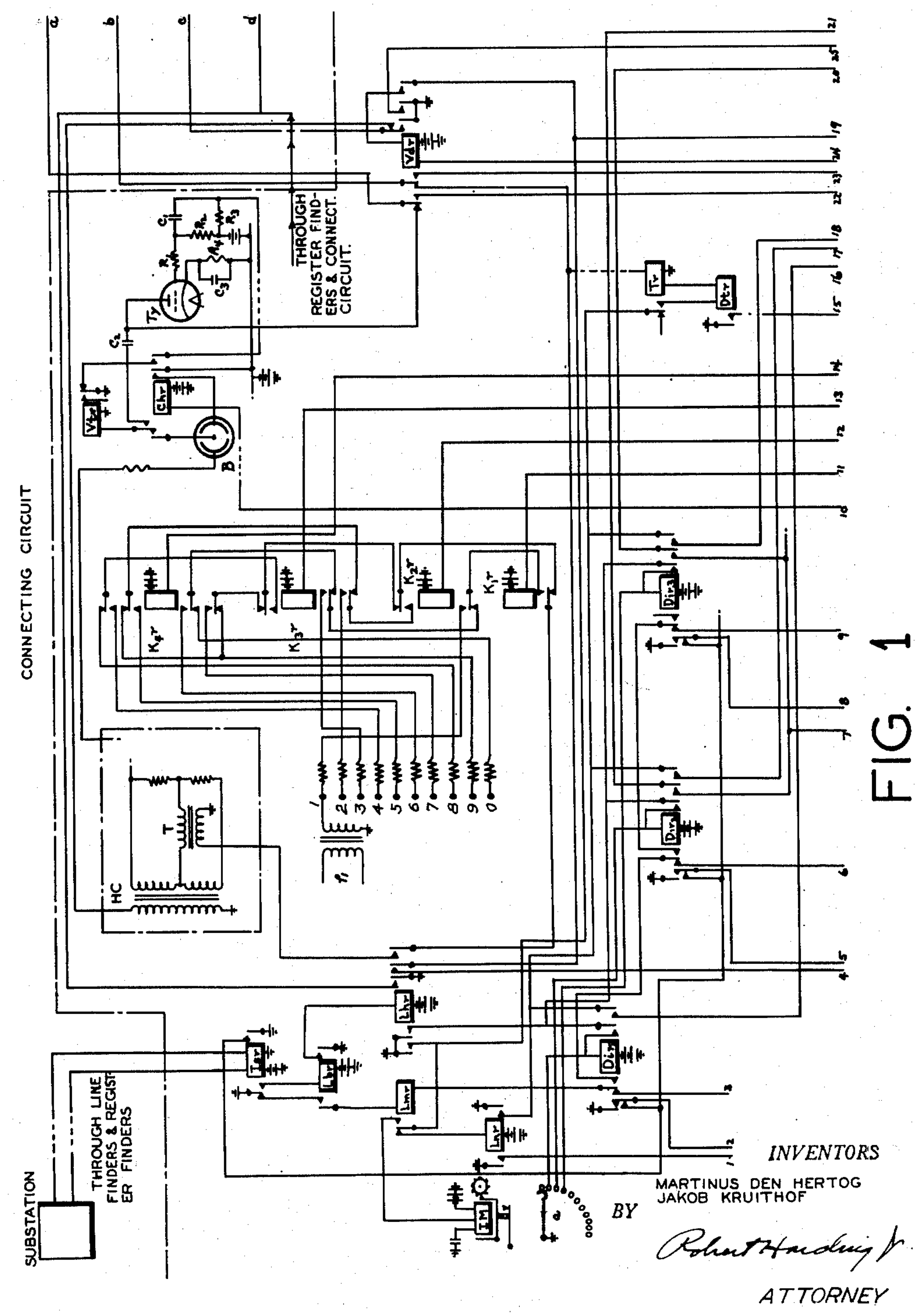
Fig. 1 represents part of a connecting circuit over which a subscriber's line and a first group selector are connected with a register controller, which is shown in the lower part of Fig. 1 and in Fig. 2.
Figure 3:
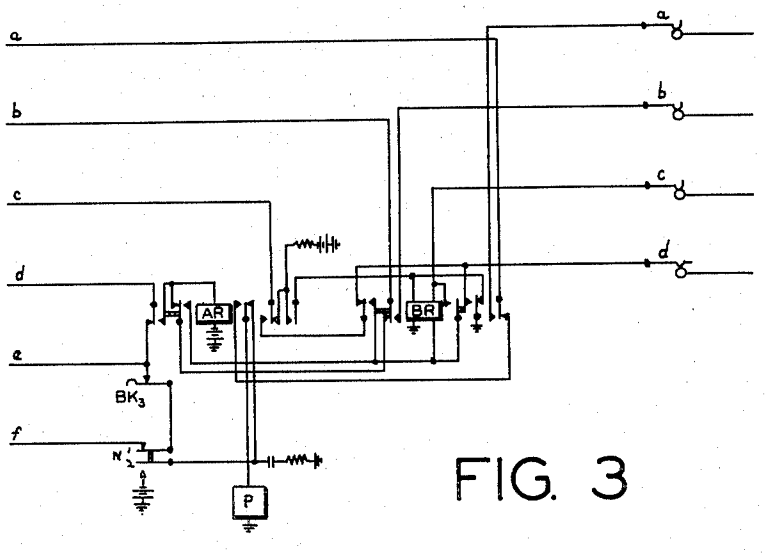
Fig. 3 represents a group selector.

It is noted that the group selector of Fig. 3 is used as first group selector in co-operation with the connecting circuit of Fig. 1, and as incoming second group selector in co-operation with the receiving device of Fig. 5. This group selector is of the type described in the U. S. application Serial No. 473,278, filed January 22, 1943 (Kruithof-Kozma-Den Hertog 11-33-22), i. e. it is a single motion switch whose different groups of outlets are characterized by the presence on the test contacts of alternating current potentials having characteristic phase shifts. The signalling method according to U. S. application Serial No. 472,623, filed January 16, 1943 (Simon-Kruithof-Den Hertog 4-8-21) now Patent 2,424,585, dated July 29, 1948, is employed. The way in which these switches are controlled by a register is described in the U. S. application Serial No. 486,275, filed May 8, 1943 (Den Hertog-Cabes 28-6).

The invention is, however, not limited to such selectors and control arrangements.

The operation of the different circuits is as follows:

*Receiving of the impulses in a calling register*

In building up a connection a calling subscriber is, through the agency of one or more stages of finders (not shown) and a connecting circuit (Fig. 1), connected to a register controller in which a relay I*sr* is energized over the subscriber's loop circuit. The energizing of I*sr* causes the consecutive energizing of L*br* and L*hr*, whereupon relay L*nr* is energized via a front contact of L*hr* and a back contact of L*mr*. Relay L*nr* energizes relay A*r* of the first group selector, Fig. 3 in the following circuit: ground, front contact of relay L*nr* (Fig. 1), brush *"d"* and home contact of step-by-step switch $SM_1$ (Fig. 2), front contact of relay L*hr*, back contact of relay V*dr*, *"b"* wire, back contact of relay B*r* (Fig. 3), back contact and winding of relay A*r* to battery. Relay A*r* is locked up over a front contact and the *"d"* wire to ground at a front contact of relay L*hr*.

Relay I*sr* follows the impulses of the dial at the calling station and transmits successive digits via the front contact of relay L*br* to the different step-by-step switches $SM_1$, $SM_2$, $SM_3$, etc. Only these three switches are shown in the drawing and each of these switches serves to receive a digit in the known way. The first digit is received in $SM_1$ via the back contact of relay D*ir*$_1$. While receiving this digit, relay L*mr* is operated and energizes the magnet of step-by-step switch IM via its front contact. When relay L*mr* releases at the end of the first digit, the switch IM takes a step upon the de-energization of its magnet and energizes relay D*ir*$_1$ which locks to ground at a front contact of relay L*hr* and transfers the in-stepping circuit from $SM_1$ to $SM_2$. In a similar way relay D*ir*$_2$ is energized at the end of the second digit and the in-stepping circuit is switched to $SM_3$, etc.

*Determination of the destination of the call*

Figure 2:
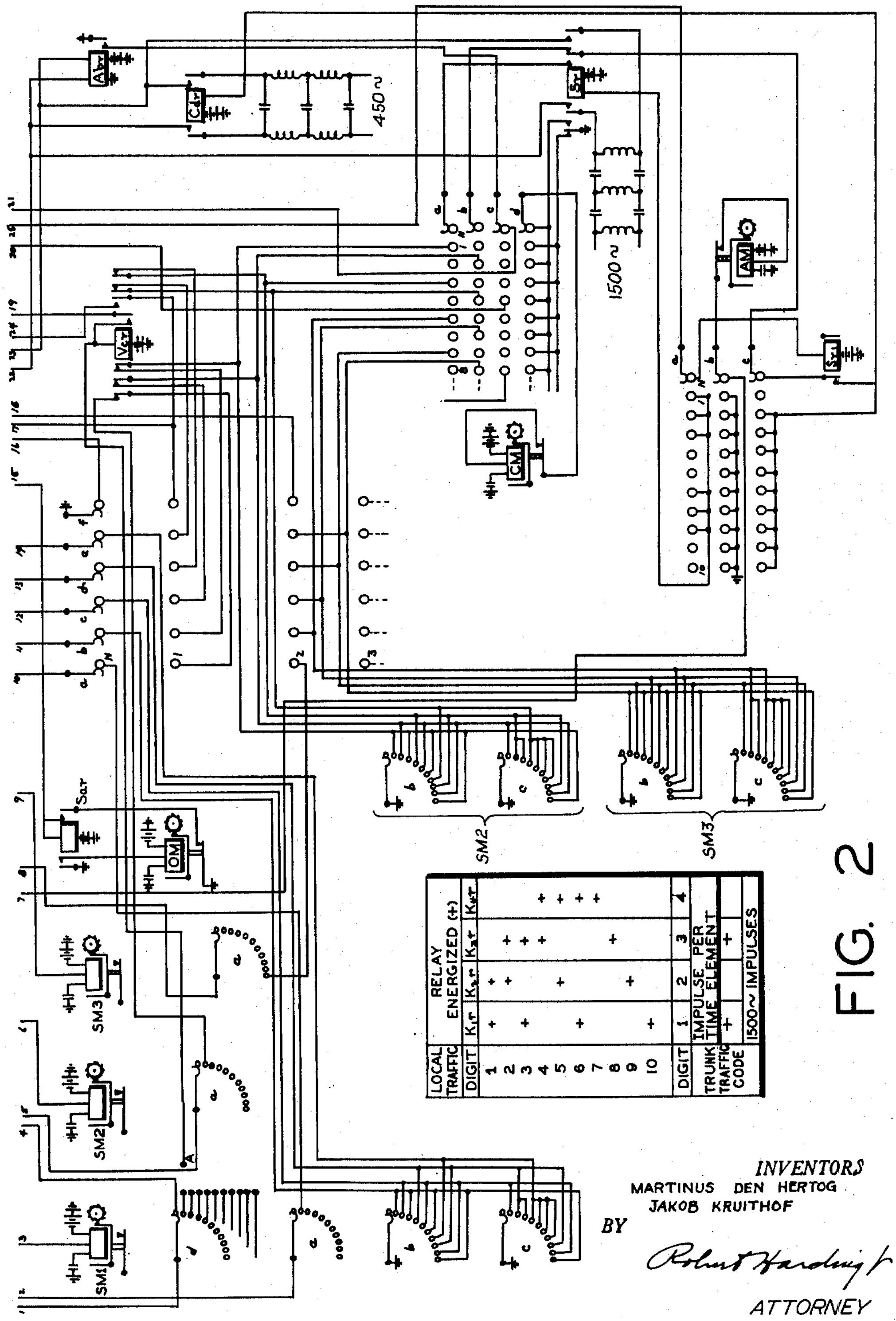

As soon as the first digit is received, the destination of the call is determined, i. e. whether the connection is desired to a subscriber of the local exchange, or of a distant exchange. To this end contact "A" in Fig. 2 is connected to all contacts of arc *"d"* of $SM_1$, which correspond to the calling digits of the distant exchanges. If, therefore, the first digit is called, relay V*cr* is energized after the first digit has been received over the circuit: ground, a front contact of relay L*nr* (which is energized as soon as relay L*mr* releases), brush *"d"* and one of the contacts in the *"d"* arc of switch $SM_1$, contact "A," winding of relay V*cr* to battery.

*Setting of the first group selector*

The drawing indicates only the principal elements of the system for the setting of the first and subsequent group selectors in the same exchange, since the way in which this takes place forms no essential part of the invention. As soon as the first impulse of the first digit is received, relay C*hr* is energized via the circuit:

Ground, front contact of relay I*sr*, back contact of relay D*ir*$_1$, brush *"a,"* contacts 1 up to and including 0 in *"a"* arc of switch $SM_1$, home contact and *"a"* brush of switch OM, winding of relay C*hr* to battery.

Via a front contact of relay C*hr* thyratron TY is brought to the discharge condition in the known way by the charge of condenser $C_1$. The magnet of the first group selector is then energized in series with the discharge space of TY via the circuit:

130 volt battery, resistance $R_4$, discharge space of TY, back contact of relay V*dr*, *"a"* wire, back contact of relay B*r* (Fig. 3), front contact of relay A*r*, magnet of group selector P, to ground.

The wires *"e"* and *"f,"* shown in Fig. 3, are not used when Fig. 3 is employed as a group selector connecting to Fig. 1.

The group selector starts to hunt from the moment the first impulse is received and will be stopped only upon the extinguishing of the thyratron, which happens when cold cathode tube B fires and discharges the condenser $C_2$.

Relay C*hr* follows the impulses of relay I*sr* while the train of impulses is being received. This speeds up the selection, because it restarts hunting if during the reception of the train of impulses the signal receiver responds to a reference current temporarily connected to an outlet. For further particulars reference is made to the description in the U. S. application Serial No. 473,278.

After the first digit has been completely received and relay D*ir*$_1$ operates, direct ground is permanently connected to brush "a" of switch $SM_1$ via a front contact of relay $Dir_1$, so that, as long as switch OM is in the home position, relay Chr is permanently energized and permits tube B to function.

During the movement of the selector brushes a signalling current is received from the free outlets over which the test brush moves and is connected to the transformer Hc in the signal receiver over the following circuit: outlet, "d" terminal of the group selector (if the outlet leads to Fig. 4 then via a front contact of relay Br, jack $BK_1$ and a back contact of relay Ar), "d" brush of the selector, back contact of relay Br (Fig. 3), front contact of relay Ar, "c" wire, back contact of relay Vdr (Fig. 1), winding of transformer HC to ground.

The transformer T of the signal receiver is supplied with a reference current which varies with the digit received. The circuit is as follows: One of the sources of reference currents 1–0 depending on the digit received, combinations of contacts of relays $K_1r$ up to and including $K_4r$, front contact of relay Lhr, primary winding of transformer T to ground.

The relays $K_1r$ up to and including $K_4r$ are energized according to a certain code, which is determined by the connections to the arcs "b" and "c" of one of the in-stepping switches $SM_1$, $SM_2$ etc. The operation of switch CM is determined by the position of switch $SM_1$, in position 1 of switch OM by the position of switch $SM_2$ etc.

The combinations of operated relays are so chosen that never more than two relays are energized simultaneously under the control of two arcs of the different step-by-step switches. Fig. 2 contains a list showing these combinations. When the received signalling current corresponds to the selected reference current, the tube B is fired and thyratron TY is extinguished. Relay Vtr also responds and start operations (not shown) which ultimately cause the relays Tr and Dtr to be energized by a direct current potential applied from the seized outlet via wire "b" (Fig. 1). Relay Dtr energizes relay Sar, whereupon switch OM moves its brushes one step. In position 1 of this switch, in case of a local connection, the next selector is set in the known way under the control of switch $SM_2$, of which the arcs "b" and "c" now influence the energization of relays $K_1r$—$K_4r$.

*Connection to distant exchange*

If a connection to a distant exchange is desired, then relay Vcr is energized and this relay opens in its five back contacts the connections to arcs "a," "b," "c," "d" and "e" in position 1 of CM, so that neither the relays $K_1r$—$K_4r$ nor relay Chr will be energized. As soon as switch CM reaches position 1, relay Vdr is energized and switches the "a" and "b" wires (Fig. 1) to the winding of relay Abr and to two filters, through which, respectively, 450 and 1500 frequency alternating current can be sent.

Assuming that a trunk to a distant exchange is seized (Fig. 4) relay Br associated with the trunk is energized when the incoming transmitter and the selector belonging thereto are standing in the home position and the following circuit is closed: ground, winding of relay Br (Fig. 4) back contact of relay Ar, "a" wire of the trunk, winding of relay Cr (Fig. 5), wire "e," insulation jack $BK_3$, belonging to the incoming selector at the distant exchange (Fig. 3) home contact $N_1$ of the selector, wire "f," insulation jack of incoming transmitter $BK_2$ (Fig. 5), wire "c" back contact of relay Ar (Fig. 3) of the incoming selector and a resistance of 600 ohms to battery.

In the operating position of relay Br (Fig. 4) signalling current is connected to the "d" terminals of the first group selectors. When the sending device is seized, relay Ar (Fig. 4) is energized in series with the windings of the relays Tr and Dtr (Fig. 1) in the register controller via the "b" wire. Ar releases relay Br and thereby removes the alternating current potential from the "d" terminal. Relay Ar removes the direct current potential from the "c" terminal, whereupon the relays Tr and Dtr in the calling register release. Relay Sar (Fig. 2) releases and switch OM is de-energized and moved one step as already described.

Relay Ar (Fig. 4) connects the "a" and "b" wires to the junction line over which relay Dr (Fig. 5) is now energized in the following circuit: grounded battery, winding of relay Abr (Fig. 2), front contact or relay Vdr (Fig. 1), "b" wire, front contact of relay Ar (Fig. 4) "b" wire of junction line, winding of relay Dr (Fig. 5), winding of relay Cr "a" wire of the junction line, front contact Ar (Fig. 4), "a" wire, front contact of relay Vdr (Fig. 1), winding of relay Abr to ground (Fig. 2).

In this position only relay Dr operates and relays Abr and Cr remain de-energized. Relay Dr applies battery via a resistance of 240 ohms to the starting circuit of the register link chooser in the called distant exchange (Fig. 5) via a back contact of relay Gr, and also connects test potential to the test bank of these finders. The details of the connection of a free register controller to the receiving device are not described. It will be sufficient to mention that, when a free register controller is connected, the relays Ftr and Fdr are energized, and that the latter energizes relay Lhr (Fig. 5). Relay Lhr connects —130 volts battery to the four tubes $B_1$–$B_4$, by means of which the voice frequency signals are received from the calling exchange. Relay Lhr also connects ground via brush "d" and the home contact of switch IM for the energization of the relay Ar of the incoming group selector over the following circuit: ground, front contact of relay Lhr (Fig. 5) brush "d" and home contact of switch IM (Fig. 6) back contact of relay Gr (Fig. 5), "b" wire, back contact of relay Br (Fig. 3), back contact and winding of relay Ar to battery. Relay Ar holds itself via the "d" wire to ground via a front contact of relay Lhr.

As soon as a free register controller is connected to the receiving device a path of low resistance is closed via the trunk line, over which relay Abr of the calling exchange register is energized as follows: ground, winding Abr (Fig. 2), front contact Vdr (Fig. 1), "a" wire, front contact Ar (Fig. 4), "a" wire of junction or trunk line (Fig. 5), winding of relay Lur (Fig. 6) back contact Tar, "b" wire of junction line, front contact Ar (Fig. 4), "b" wire, front contact Vdr (Fig. 1), winding Abr and battery (Fig. 2).

Relays Abr and Lur are energized in this path. Relay Lur closes a holding circuit for the holding relay Lhr (Fig. 5) of the associated register which is independent of Fdr. The relay Abr (Fig. 2) starts the transmission of the second digit, if it has been received in the meantime and the relay $Dir_2$ is energized.

The transmission of the impulses of the second digit takes place at voice frequency under the control of two step-by-step switches AM and CM.

AM has eleven positions and three rows of terminals, and makes a complete rotation for each digit which is sent out. It controls the movement of CM, which has a home position and four positions for each transmittable digit. Each of these four positions corresponds to a time element of the sending code used. These four time elements must be obtained by the sending of two impulses at a frequency of 1500 cycles and consist of two circuit closures and two openings.

Depending on the digit to be sent out, a signal of 450 cycles is sent during one or more of the periods formed by the four above-mentioned time elements. The code is the same as that used for the energization of the relays $K_{1}r$—$K_{4}r$ indicated in the operating table for these relays (Fig. 2) which shows that for the transmission of digit 1, a signal of 450 cycles will be sent during the first two time elements, and that no such signal is sent during the last two time elements. Impulses of 1500 cycles takes place during the first and third time elements and not during the second and fourth time elements.

The circuits for sending digit 1 will now be described:

Assuming that the second digit has been received when relay A*br* becomes energized, step-by-step switch AM is moved from the home position in the following circuit: ground, front contact of relay A*br*, "*c*" brush and home contact in "*c*" arc of switch CM, front contact of relay $Dir_2$, home contact in "*b*" arc and "*b*" brush of switch AM, interrupter and magnet of switch AM to battery.

Switch AM moves one step and now finds direct ground via the contacts 1–10 of its arc "*b*" insuring that the switch makes a complete rotation and returns to the home position. Two current impulses are given to relay S*r* during this rotation; one in positions 1, 2 and 3 and the second in positions 6, 7 and 8. The circuit for relay S*r* is: ground, front contact of relay V*dr*, brush "*a*" and contacts of "*a*" arc of switch AM, winding of relay S*r*, to battery.

Relay S*r* connects a 1500 cycle alternating current source over a suitable filter to the "*a*" and "*b*" wires of the junction line, so that during one rotation of switch AM two 1500 cycle impulses are sent.

The first time relay S*r* is energized, switch CM moves from position N to position 1, its circuit being from ground, front contact of relay S*r*, contact N in "*d*" arc and"*d*" brush to switch CM, interrupter and magnet of CM, to battery.

When relay S*r* releases, switch CM moves from position 1 to position 2 via contact 1 in arc "*d*." The second time relay S*r* energizes and releases, switch CM moves successively to the positions 3 and 4.

When switch AM completes its first rotation, switch CM is in position 4 and switch AM cannot leave the home position via the circuit described above.

While the switch CM is in positions 1, 2, 3 and 4, the time elements for sending 450 cycle alternating current are selected. For the first digit to be transmitted, this takes place under the control of the position of switch $SM_2$. Relay C*dr* is energized in these four positions via brushes "*b*" and "*c*" of switch $SM_2$. For the transmission of the digit 1, as will now be described, this takes place only during the first two time elements, i. e. when switch CM is in positions 1 and 2. The first 450 cycle impulse starts at the moment that switch CM arrives in position 1 and while relay S*r* is still energized, by the operation of relay C*dr* in the circuit: ground via brush "*b*" and contact 1 in "*b*" arc of switch $SM_2$, contact 1 in arc "*a*" and "*a*" brush of switch CM, front contact of relay S*r*, "*c*" brush and contacts 2 and 3 in "*c*" arc of switch AM, winding of relay C*dr* to battery.

It should be noted that the energization of relay C*dr* starts only after switch CM has moved from position N to 1. At this moment switch AM is already in position 2. Relay C*dr* releases upon the opening of the front contact of relay S*r*, before switch CM leaves position 1.

The second energization of relay C*dr* takes place when switch CM arrives in position 2 and as long as relay S*r* is without current, the circuit being: ground, brush "*c*" and contact 1 in "*c*" arc of switch $SM_2$, contact 2 in "*b*" arc and "*b*" brush of switch CM, back contact of relay S*r*, "*c*" brush and contacts 4, 5 and 6 in "*c*" arc of AM, winding of relay C*dr*, battery.

When S*r* releases and while switch CM is still in position 1, the circuit for relay C*dr* remains open. It is only closed when switch CM arrives in position 2. When relay S*r* is energized for the second time relay C*dr* releases before switch CM has left position 2. In the present example no ground is applied to relay C*dr* in the positions 3 and 4 of switch CM.

If a code is sent for which ground is provided in position 4, e. g. the digit 7, then the circuit for relay C*dr* is closed in positions 9 and 10 of switch AM via arc "*c*," and remains closed via a back contact of relay $Sr_1$ after switch AM returns to the home position, whereupon relay $Sr_1$ is energized via the "*a*" brush of switch AM and opens the circuit of relay C*dr*. Thus the relay C*dr* is energized during the fourth interval as long as during the other intervals. Relay $Sr_1$ is energized as long as relay S*r*, and it serves to de-energize relay C*dr* in position N of switch AM, which in position 6 of switch AM is done by energizing relay S*r*.

All this happens before the third digit is received, switch AM remaining in position N after its first rotation until relay $Dir_3$ becomes energized. If relay $Dir_3$ is energized when switch AM first arrives in position N, then a circuit is immediately closed to drive it out of this position: ground, front contact of relay A*br*, "*c*" brush and contact 4 in arc "*c*" of switch CM, front contact of relay $Dir_3$, contact N in arc "*b*" and "*b*" brush of switch AM, interrupter contact and magnet of switch AM to battery.

The circuit for relay C*dr* is also interrupted when switch AM leaves the home position since contact 1 in arc "*c*" of AM is not connected. This is necessary, because the circuit for relay C*dr* may only be closed after the operation of relay S*r* and after the switch CM has reached position 5. When switch AM reaches position 1 for the second time, switch CM is still in position 4, and if the circuit of relay C*dr* were not open then it would be energized via the back contact of relay S*r* and brush "*b*" of switch CM in position 4, before relay S*r* had time to operate.

Relay S*r* becomes energized when switch AM reaches position 1, and opens its back contact to insulate contact 4 in arc "*b*" of switch CM before switch AM reaches position 2.

It will be seen, therefore, that switch AM makes one rotation for each digit sent out, and that in four consecutive positions of switch CM, corresponding to the four time elements of two 1500 cycle impulses, the sending of a pulse of 450 cycles is determined by the application of ground via the "b" and "c" brushes of the various digit switches. Both kinds of alternating currents are connected over filters to the "a" and "b" wires whereby they may be simultaneously connected to a junction line without danger of alternating current flowing from one source to the other. Slight mixing of both kinds of current would have no detrimental effect because only one predetermined frequency can pass through each filter.

We shall now describe the reception of the digits in the register circuit at the called office. Alternating current signal receivers of the kind described in the U. S. application Serial No. 473,272, filed July 11, 1941 (Cabes 8), are employed. Two of these signal receivers are so connected by filter circuits to the junction line that one of them responds to 1500 cycle pulses and the other to 450 cycle pulses independently of one another and whether one or both frequencies are sent. Relay *Sr* (Fig. 6) is energized by 1500 cycle pulses and relay *Cdr* by 450 cycle pulses.

The 1500 cycle pulses always starts before a 450 cycle pulse can follow within a given time element or period. At the end of this time element the 450 cycle pulse is removed after the 1500 cycle pulse with a very small delay. This delay is equal to the time required for relay *Cdr* (Fig. 2) to de-energize. During the time interval used for sending an impulse of 450 cycles, such impulse will start only with some delay after the commencement of the interval during which no current of 1500 cycles is present. At the end of this interval the pulse of 450 cycles is terminated with a very small delay after a following pulse of 1500 cycles commences, which delay is again equal to the time relay *Cdr* required for its de-energization. These time limits are important for discrimination between the different codes.

The receiving and sorting of the codes are controlled by means of a switch IM (Fig. 6) which has a home position and a position for each of the digits to be received. This switch is moved under the control of relay $Sr_1$ which, in turn, follows relay *Sr*. Relay *Sr* operates on the 1500 cycle pulses, whereby switch IM takes the same number of steps as switch CM in the calling exchange (Fig. 2). The stepping is controlled by a changeover contact on relay $Sr_1$ and the connections in arc "a" of switch IM so that IM takes one step at every time relay $Sr_1$ operates or releases.

Assuming that the digit "1" is sent out when switch IM is stepped into position 1 by the first 1500 cycle pulses, current of 450 cycles is connected to the line and operates relay *Cdr* (Fig. 6). A circuit is closed over a front contact of relay *Cdr*, a front contact of relay $Sr_1$, brush "b" of switch IM for relay $E_1r$. At the end of the 1500 cycle pulse the relays *Sr* and $Sr_1$ release and switch IM moves to position 2, but before this position can be reached the reday *Cdr* releases. After a short delay relay *Cdr* operates again as it does during the second time element interval when 450 cycle impulse is sent out. A circuit is closed for relay $E_2r$ via the front contact of relay *Cdr*, the back contact of relay $Sr_1$, brush "c" and contact 2 in arc "c" of switch IM.

At the end of this interval relays *Sr* and $Sr_1$ again operate and switch IM moves to position 3, but first relay *Cdr* releases. Relay *Cdr* does not respond any more, so that only the relays $E_1r$ and $E_2r$ are operated and keep themselves energized via a front contact of relay *Lhr*.

The other digits are received in the same way.

A set of four relays respond to each digit $T_1r$–$T_4r$, for the next digit, $D_1r$–$D_4r$ for the following one, etc. While the two 1500 cycle pulses are sent for each digit, relay *Lmr* is energized in series with relay $Sr_1$. Assuming that there is a certain delay between the sending of two consecutive codes, relay *Lmr* will be without current during this interval whereby relay *Lnr* releases and closes a circuit for relay $Dir_1$ via one of its back contacts after receipt of the first digit, for relay $Dir_2$ after the second digit, etc. After the receipt of the first digit switch IM is in position 4, and when relay *Lnr* releases, the following circuit is closed for relay $Dir_1$: ground to front contact of relay *Lhr*, brush "d" and contact 4 in arc "d" of switch IM, back contact of relay *Lnr*, winding of relay $Dir_1$ to battery.

When, however, two consecutive codes are sent without delay, relay *Lmr* has not sufficient time to release between the two codes. It then remains operated as does relay *Lnr*, and the circuit for relay $Dir_1$ is closed independently from the back contact of relay *Lnr*, via the contacts 5, 6 and 7 in arc "d" of switch IM. The relays $Dir_1$, $Dir_2$, etc. indicate that the corresponding digits are completely received and that the corresponding selector settings may be started.

*Connection remains local in distant exchange*

The first set of relays $E_1r$–$E_4r$ has an additional contact by which four auxiliary relays $Ds_1r$–$Ds_4r$ are operated. These auxiliary relays close a circuit as soon as relay $Dir_1$ is energized, i. e., as soon as the first digit is completely received, for determining whether the first digit indicates that the connection must be established locally, or whether a connection to a third distant exchange must be made. If the called line is in the exchange just reached, then relay *Lor* will be energized, point A in Fig. 6 being connected to the points 1–0 corresponding to the digits which indicated a local call. The functions of relay *Lor* are as follows:

During the sending of the first digit received in the called register, relay *Tar* is energized via contacts 1, 2 and 3 of arc "d" of switch IM (Fig. 6). This relay opens in a back contact the loop over the junction line. The result is that during the transmission of the first digit, relay *Abr* in the calling register (Fig. 2) releases and, after the digit is sent, switch AM remains in the home position. As soon as relay *Lor* is energized as described above, relay *Tar* releases owing to the opening of its holding circuit in a back contact of relay *Lor*. Relay *Tar* now again closes the loop via the junction line, so that the sending of the next digits may proceed. These digits are received in the register controller (Fig. 6) of the distant exchange under consideration.

Another function of relay *Lor* is that it opens a circuit by which relay *Gr* could operate in the receiving device (Fig. 5) after completion of the first selection, when switch OM reaches position 1 (Fig. 6).

The local selector settings in the distant exchange are controlled by switch OM, which has a position for each setting, and the four relays $K_1r$–$K_4r$ (Fig. 5), which function in the same way as described in connection with Figs. 1 and 2. These relays now find an operating ground via the holding contacts of the recording relays $E_1r$–$E_4r$ for the first digit received in position N of OM, of relays $T_1r$–$T_4r$ for the second digit received in position 1 of OM, etc. A detailed description of this selector setting may here be omitted, as this forms no essential part of the invention.

At the end of the last setting, switch OM reaches a position in which brush "*f*" closes a circuit for the operation of relay G*r* in the receiving device. The register controller is at the same time released, whereas relay G*r* switches through the talking connection and holds itself under the control of the relays C*r* and D*r* (Fig. 5). When the called subscriber answers, the feeding relays E*r* and F*r* are energized, which short-circuit relay D*r* and in this way switch through the answering signal to the calling exchange.

*Tandem connection*

When the call must be switched through the second exchange to a third exchange, via a second junction line, relay L*or* does not become energized. As a result thereof, relay T*ar* will remain energized after the first digit is received, and this will keep the loop via the first junction line open, so that no further digits are sent from the calling register. Under the control of the digit received in the distant register controller, the incoming group selector in the second exchange is set to seize a junction line to a third exchange. When this is accomplished and switch OM moves one step, a circuit is closed for the operation of relay G*r* (Fig. 5) via the brush "*f*" of switch OM and contact 1 in arc "*f*." The register controller (Figs. 5 and 6) is released and the incoming group selector in the tandem exchange is brought in the talking position as described for local connection. The battery and ground, which are supplied by the feeding relays F*r* and E*r* via the second junction line, now serve to seize a register circuit in the third exchange, by energizing relay D*r* in the same way as in the tandem exchange. As soon as the low resistance loop is closed in the register of the third exchange, the relays E*r* and F*r* in the tandem exchange operate (Fig. 5) and short-circuit relay D*r*, whereupon relay A*br* is energized in the register of the "calling" exchange (Fig. 2) in series with relay C*r* (Fig. 5). This indicates that the sending of the next digits may proceed. These digits are now sent through the feeding bridge of the tandem exchange (Fig. 5) to the third exchange in the form of voice frequency pulses. The operations in the third exchange are the same as in the second exchange.

A special application of the signaling system according to the invention has been described. Obviously, the invention is not limited to such system but may be modified in many other ways and find other applications.

What is claimed is:

In an electrical selective signalling system, a sending device, a receiving device, a line interconnecting said devices, said sending device comprising a plurality of sources of alternating current of different frequencies, a plurality of digit switches, one for each digit to be transmitted, a first, multi-bank, step-by-step switch, means for connecting said first step-switch to said digit switches, said first switch adapted to operate under control of said digit switches, a second multi-bank, step-by-step switch, circuit means to operate said second step-switch including selected contacts of one of the banks of said first step-switch, said second step-switch having the contacts of one of its said banks arranged to provide a plurality of positions for each transmittable digit, the number of positions equal to the number of digits to be accommodated by the system, each position corresponding to a time element of the sending code used in the system, means including said second step-switch for controlling the connection of a first one of said sources to said line over selected contacts of another of its said banks, thereby to cause impulses to be transmitted over said line from said first source at the rate of two for each digital position of said step-switch, means including selected contacts of another of the banks of said first step-switch for connecting a second of said sources to said line, said last named means also including selected contacts of another of the banks of said second step-switch, whereby a plurality of time elements is defined by the intermittent application to said line during alternate time elements a current of one frequency and a current of another frequency during a selected time element, and selector means associated with said receiving device and variably operable, in accordance with the receipt over said line from said sending device, of currents of both frequencies.

MARTINUS DEN HERTOG.
JAKOB KRUITHOF.

REFERENCES CITED

The following references are of record in the file of this patent:

UNITED STATES PATENTS

| Number | Name | Date |
|---|---|---|
| 2,057,868 | Woochinger | Oct. 20, 1936 |
| 2,072,079 | Blodgett | Mar. 2, 1937 |
| 2,154,776 | Saville et al. | Apr. 18, 1939 |
| 2,272,070 | Reeves | Feb. 3, 1942 |
| 2,272,464 | Hensler | Feb. 10, 1942 |
| 2,301,961 | Logan | Nov. 17, 1942 |
| 2,320,081 | Holden et al. | May 25, 1943 |
| 2,341,746 | Taylor et al. | Feb. 15, 1944 |
| 2,375,053 | Vaughn | May 1, 1945 |
| 2,443,198 | Sallach | June 15, 1948 |
| 2,476,343 | Wiseman et al. | July 19, 1949 |

FOREIGN PATENTS

| Number | Country | Date |
|---|---|---|
| 489,609 | Great Britain | July 25, 1938 |